Patented Feb. 20, 1945

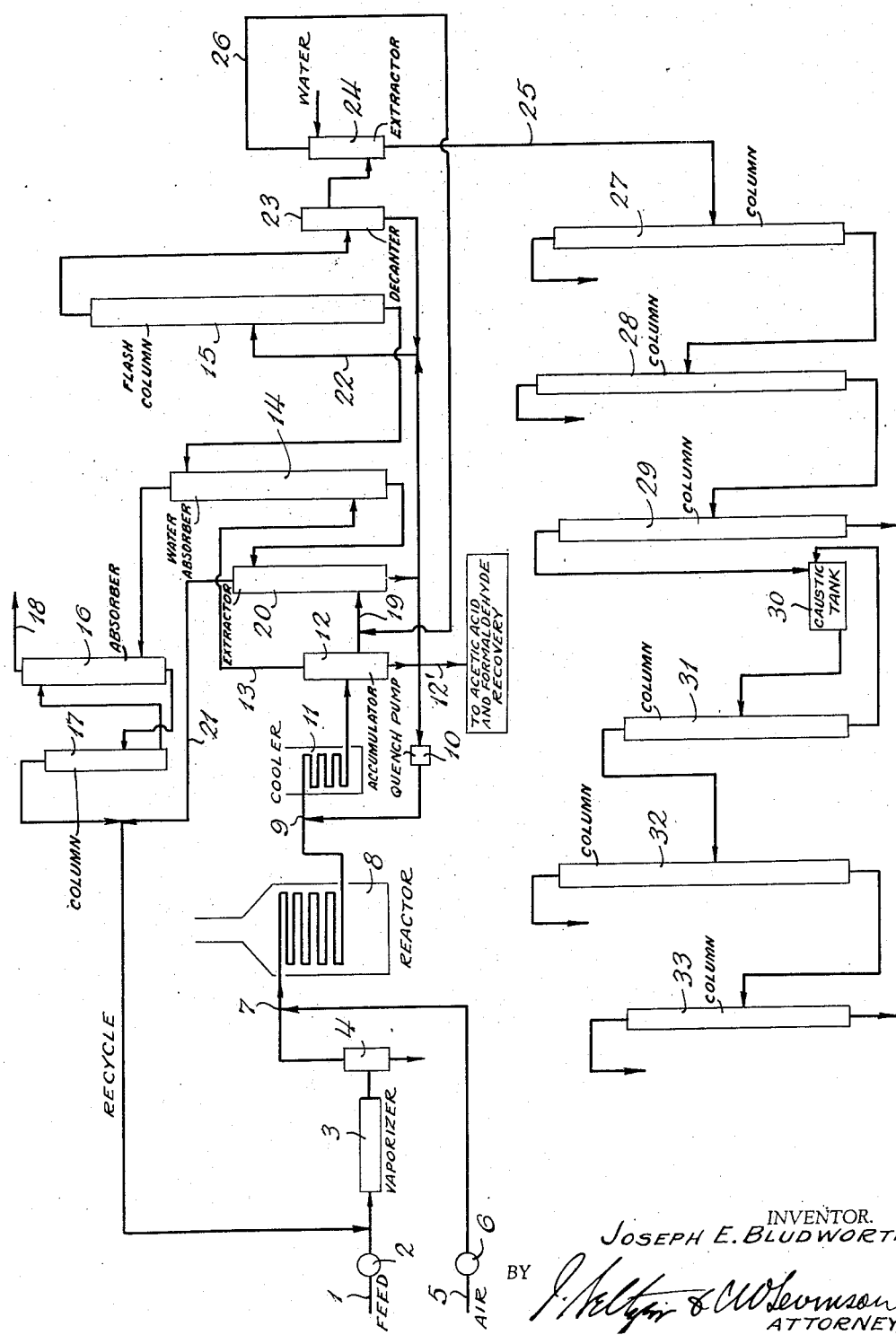

2,369,710

UNITED STATES PATENT OFFICE 2,369,710

PROCESS FOR THE PRODUCTION OF OXYGENATED ORGANIC COMPOUNDS

Joseph E. Bludworth, Cumberland, Md., assignor to Celanese Corporation of America, a corporation of Delaware Application June 28, 1941, Serial No. 400,222

2 Claims. (Cl. 260—451)

This invention relates to the preparation of oxygenated organic compounds by processes involving the oxidation of hydrocarbons and relates more particularly to the formation of lower aliphatic oxygenated compounds in relatively large yields.

An object of my invention is to prepare oxygenated organic compounds by the oxidation of hydrocarbons in such a manner that the nature of the products formed may be controlled.

Another object of my invention is to provide a process for the oxidation of hydrocarbons wherein the number of oxygenated organic compounds formed is relatively small and whereby such compounds may be separated in relatively pure form.

Other objects of my invention will appear from the accompanying drawing and the following detailed description.

It has been proposed heretofore to form oxygenated organic compounds by the oxidation of hydrocarbons. However, in such prior processes, the number of oxygenated organic compounds formed in the reaction is very large with the result that it is practically impossible to separate them into commercially pure components in a satisfactory manner. In addition, such prior processes were operated at relatively high pressures and temperatures and to ensure a proper safety factor during the operation, these processes required expensive installations which were adapted to withstand the high pressures and temperatures employed. It was likewise found that the use of catalysts and catalytic masses in the reaction was essential to obtain a desirable conversion. The use of catalysts is a distinct disadvantage since they are easily poisoned and must be replaced or their activity must be regenerated frequently.

I have now discovered that oxygenated organic compounds may be prepared by subjecting aliphatic hydrocarbons to oxidation in the vapor phase at a superatmospheric pressure below 100 pounds per square inch with free oxygen in the absence of oxidation catalysts. By carrying out the oxidation of the hydrocarbons under these conditions, and more particularly when utilizing aliphatic hydrocarbons of at least five carbon atoms as starting materials, excellent yields of oxygenated organic compounds such as acetaldehyde, propionic aldehyde, acetone, methanol, acetic acid, formaldehyde and other, higher boiling, oxygenated compounds may be obtained.

The oxidation process of my invention may be carried out in a convenient manner by heating the aliphatic hydrocarbons to a temperature at which vaporization takes place and then passing the vapors in admixture with air or other oxygen-containing gas into a heated reactor under the desired pressure where the mixture is heated and the oxidation reaction takes place. The air or other oxygen-containing gas and the hydrocarbon vapors may, if desired, be preheated separately and admixed just prior to their entrance into the reactor. The reactor preferably comprises a preheater zone or furnace where the hydrocarbon vapors mixed with the oxygen-containing gas are brought up to reaction temperature, and an insulated reaction chamber proper where the exothermic oxidation reaction occurs and is allowed to proceed to the desired extent. While the preheater zone and the insulated reaction chamber may be housed in one unit, the insulated reaction chamber may also be set apart from the preheater. Since the reaction is exothermic it may be initiated and completed, after a proper degree of preheating, in the separate insulated reaction chamber and no external heat need be added in the latter. After the oxidation reaction has been completed, the reacting gases and vapors are immediately cooled by quenching them with an aqueous liquid and the resulting gases and vapors are then conducted to a suitable system for the recovery and separation of the several oxygenated products formed.

My process may be employed for the oxygenation of saturated aliphatic hydrocarbons in general but, as stated, the aliphatic hydrocarbons which are especially suitable for oxygenation in accordance with my process are those hydrocarbons having at least five carbon atoms in the structure thereof. Such hydrocarbons may be obtained from petroleum distillates and suitable mixtures of such hydrocarbons are found in the petroleum fraction identified as natural gasoline. My process is also applicable in the oxygenation of other petroleum fractions such as kerosene, topped distillate, naphtha and gas oil.

The amount of oxygen employed in the oxygenation reaction in proportion to the hydrocarbon being oxygenated is of importance in determining the nature and yield of the oxygenated products formed. It should be noted that hereinafter the proportion of oxygen to be employed in carrying out the oxygenation is given in terms of the hydrocarbon comprising the fresh feed. The hydrocarbon which is passed through the reaction chamber is, however, as a matter of practice supplied from two distinct sources, one comprising fresh feed and the other comprising unreacted hydrocarbon which is recycled in the process after all oxygenated compounds have been separated therefrom. For the best results, the amount of oxygen employed is that present in from 4.1 to 10.3 pounds of air per pound of fresh hydrocarbon being oxygenated, while recycling from 10 to 40 pounds of hydrocarbon back to the reaction chamber. Preferably, I employ a ratio of about 1 part by weight of fresh hydrocarbon feed to about 6 parts by weight of air and about 15 parts by weight of recycled hydrocarbon.

The reaction time, or the time during which the oxidation reaction is permitted to proceed, should be relatively short so as to inhibit the onset of decomposition reactions or side reactions which tend to form excessive amounts of undesirable by-products such as $CO_2$, CO and tars. Ordinarily, the reaction is permitted to proceed in the insulated reaction chamber for a period from 0.1 to 1.0 second, preferably from 0.2 to 0.5 second, before quenching. The best results are obtained where the velocity of the reacting gases in the reaction chamber is such that the total reaction time is about 0.25 second. The temperature at which the reaction is carried out is dependent on the reaction time and the material being oxygenated, and should generally be from about 625° F. to 700° F. More preferably the reaction temperature should be maintained at about 670° F. After reaction has proceeded to the desired extent, the gases and vapors are cooled by quenching and reduced to a temperature of about 285° F.

The superatmospheric pressures under which the oxidation reaction of my invention may be carried out should be less than a maximum of 100 pounds per square inch, and excellent results may be obtained when operating at pressures of from 25 to 50 pounds per square inch. Preferably, my process is operated at a pressure of about 40 pounds per square inch. While lower pressures are operative, a pressure of 40 pounds per square inch has been found to result in optimum yields after due consideration of all the economic factors involved.

The accompanying drawing shows diagrammatically a form of apparatus that may be used in carrying out my invention.

In the drawing, the hydrocarbon feed enters the process through a line 1 and is fed to a pump 2 which forces it under pressure into a vaporizer 3. The hydrocarbon vapors formed in vaporizer 3 are then passed through a vaporizer trap 4 where any heavy residue is caught and may be discharged from the process. The desired oxygen-containing gas, such as air, enters through a line 5 and is forced into the system under pressure by a compressor 6. The oxygen-containing gas is mixed with the hydrocarbon vapors at 7 and the mixture then enters the reactor 8, which comprises a preheating element, and a reaction chamber which is suitably insulated or lagged. In the reactor 8 the mixture of hydrocarbon and oxygen-containing gas is preheated to reaction temperature and is then permitted to react in the insulated reaction chamber thereof. After leaving the reactor 8, the reaction gases and vapors are immediately quenched by an aqueous liquid forced into the system at 9 by a pump 10. The cooled gases and vapors together with the aqueous quench liquid are passed to a cooler 11 and after being sufficiently cooled the reaction products enter an accumulator 12. A gaseous fraction containing both hydrocarbon vapors and some water-soluble constituents is sent overhead through line 13 to a water absorber 14 where the water-solubles are removed from the gases with recycling water from a flash column 15. The hydrocarbons are passed overhead and absorbed in an absorber 16, the absorbed material being transferred to the stripper column 17, where it is removed from the absorber oil by distillation and recycled to the reaction. The gases such as nitrogen are vented through a line 18.

The liquid portions of the product separate in the accumulator 12 into an upper hydrocarbon layer and a lower aqueous layer. The upper hydrocarbon fraction is removed from accumulator 12 through line 19 and is passed to an extractor 20 where the hydrocarbon is washed counter-currently with water from absorber 14 to remove any water-soluble compounds. The liquid hydrocarbon leaving at the top of extractor 20 is recycled to the reaction chamber through a line 21 to join the recycle from stripper column 17.

The third or aqueous lower fraction is removed from the base of accumulator 12. A portion of this aqueous fraction is employed as the quench liquid introduced at 9 by pump 10, another portion is removed through line 12' and acetic acid and formaldehyde recovered therefrom while the remainder is united with the aqueous liquid from the base of extractor 20 and sent to flash column 15 through line 22. In flash column 15, an overhead fraction consisting of unreacted hydrocarbon, oxygenated compounds and a small amount of water is taken off at the top and sent to a decanter 23. The aqueous liquid from the base of the flash column which is substantially free of any oxygenated products is recycled to the top of water-absorber 14. In the decanter the distillate separates into an upper oily layer and a lower aqueous layer, the latter comprising the small amount of water which has come over with the overhead fraction from column 15 and a small amount of water-soluble oxygenated products which may be dissolved therein. The lower aqueous layer is recycled to the flash column 15 to recover any of the water-soluble compounds present while the oily portion which contains the major proportion of the water-soluble products passes to an extractor 24. In the extractor, the oily portion is washed counter-currently with water and all water-soluble oxidation products removed at the base through line 25. The water-insoluble portion is recycled through line 26 to line 19 where it enters the extractor 20 together with the hydrocarbon fraction from accumulator 12. The water-soluble portion from extractor 24 is separated into its individual components by passing through a series of distilling columns. The acetaldehyde is distilled off in column 27 and passes out at the top of the column, while the residue is removed from the base of column 27, and fed to column 28, where the propionic aldehyde is distilled off. The residue from column 28 is fed to a column 29 where a crude acetone and methanol cut is made. This distillate is sent to a tank 30 for caustic treatment to remove traces of aldehyde and the treated solution is then fed to a column 31 where the acetone and methanol are separated from the caustic solution, the caustic being recycled to tank 30. The residue leaving at the base of column 29 is composed of some water and high boiling oxygenated compounds. These materials are sent to storage. The acetone and methanol distillate from column 31 is fed to column 32 where it is water treated to break the azeotropic mixture of acetone and methanol. The acetone is taken off overhead from column 32 and the residue of methanol and water is fed forward to a column 33 where the methanol is taken off overhead and the still bottoms or residual water is discharged to the sewer.

In operating my process, the recycled hydrocarbons from extractor 20 and from stripper column 17 are united and sent back to the reaction as a liquid recycle. Due to the nature of the reaction this liquid recycle contains a certain amount of non-volatile resinous material which, unless removed, causes the formation of carbonaceous deposits in the reactor tubing. Such deposits result in plugged tubes and in low heat transfer rates. I have found that it is possible to eliminate these resinous materials if the recycled liquid hydrocarbons are first flashed to a vapor in the vaporizer 3 and then led to the vaporizer trap 4. Since the hydrocarbons may be flashed to vapor at a relatively low temperature the non-volatile resinous materials in the recycled hydrocarbon remain liquid and concentrate at the base of the trap and in this way may be easily removed from the system. This important and novel step contributes considerably to the success of my process and yields a clean recycle and, consequently a process which is unusually free of carbonizing difficulties.

In order further to illustrate my invention but without being limited thereto the following example is given.

Example

Natural gasoline of a liquid density of 0.648 comprising essentially of a mixture of saturated hydrocarbons of the pentane, hexane, and heptane series and boiling in a range of from 100° F. to 246° F. is employed in this process. 1 part by weight of this gasoline is fed into the oxidation system through line 1 and forced into vaporizer 3 by pump 2 together with 15 parts by weight of recycle gasoline coming from the stripper column 17 and extractor 20. The gasoline vapors are mixed with 6.18 parts by weight of air which are forced into the system at 7 by compressor 6. The pressure in the system is maintained at 40 pounds per square inch gauge. The mixture of air and gasoline vapors is then preheated to about 635° F. in the preheater section of reactor 8 and is passed to the reaction chamber thereof where the temperature rises to a maximum of about 670° F. due to the oxygenation reaction which takes place. The reacting gases and vapor are forced through the reactor at a maximum velocity of 40 feet per second and the total reaction time in the reaction chamber is 0.2 second. As the reaction gases and vapors leave reactor 8 they are immediately quenched to below reaction temperature with aqueous liquid, recycled from other parts of the process and forced in by pump 10, the reaction gases and vapors being cooled to about 285° F. The oxygenated products are then separated from the unreacted gasoline and inert gases as described hereinbefore. The products thus obtained per 100 pounds of fresh gasoline fed into the process are 40 pounds of acetaldehyde, 20 pounds of an azeotropic mixture comprising 90% acetone and 10% methanol, 30 pounds of high boiling oxygenated compounds, 16 pounds of acetic acid and 24.7 pounds of formaldehyde. The acetaldehyde may be converted to acetic acid by a suitable oxidation process and the yield of acetic acid thus greatly increased.

It is to be understood that the foregoing detailed description and drawing are given merely by way of illustration and that many variations may be made therein without departing from the spirit of my invention.

Having described my invention, what I desire to secure by Letters Patent is:

1. Method of producing oxygenated organic compounds, which comprises subjecting one part by weight of gasoline comprising hydrocarbons of from 5 to 7 carbon atoms, together with about 15 parts by weight of recycled gasoline, to oxidation in the vapor phase at a superatmospheric pressure of from 25 to 50 pounds per square inch at a temperature of from 625 to 700° F. with about six parts by weight of air in the absence of oxidation catalysts, maintaining the reactants in the heated reaction zone for from 0.1 to 1.0 second, rapidly cooling the oxidation reaction products by quenching said products with an aqueous liquid, separating the water-soluble products of reaction from the reaction mixture, flashing free of resinous materials the unreacted gasoline to be recycled, and recycling.

2. Method of producing oxygenated organic compounds, which comprises subjecting one part by weight of gasoline comprising hydrocarbons of from 5 to 7 carbon atoms, together with about 15 parts by weight of recycled gasoline, to oxidation in the vapor phase at a superatmospheric pressure of about 40 pounds per square inch at a temperature of about 670° C. with about six parts by weight of air in the absence of oxidation catalysts, maintaining the reactants in the heated reaction zone for from 0.1 to 1.0 second, rapidly cooling the oxidation reaction products by quenching said products with an aqueous liquid, separating the water-soluble products of reaction from the reaction mixture, flashing free of resinous materials the unreacted gasoline to be recycled, and recycling.

JOSEPH E. BLUDWORTH.